Feb. 17, 1931.   E. C. DOOLITTLE ET AL   1,792,681
METHOD AND APPARATUS FOR MAKING BERETS
Filed April 1, 1930   2 Sheets-Sheet 1

INVENTORS,
Earl C. Doolittle,
Alexander S. Carrillo,
BY
F. E. Maynard
ATTORNEY.

Feb. 17, 1931.  E. C. DOOLITTLE ET AL  1,792,681
METHOD AND APPARATUS FOR MAKING BERETS
Filed April 1, 1930  2 Sheets-Sheet 2

INVENTORS,
Earl C. Doolittle;
Alexander S. Carrillo;
BY
F. E. Maynard
ATTORNEY.

Patented Feb. 17, 1931

1,792,681

UNITED STATES PATENT OFFICE

EARL C. DOOLITTLE AND ALEXANDER S. CARRILLO, OF LOS ANGELES, CALIFORNIA, ASSIGNORS TO ANGELUS SOUVENIR & MFG. CO., A CORPORATION OF CALIFORNIA

METHOD AND APPARATUS FOR MAKING BERETS

Application filed April 1, 1930. Serial No. 440,795.

This invention relates to a method and means for the manufacture of a type of hat known as a beret.

It is an object of the invention to provide for the production of a one-piece hat or cap made of a suitable quality of felt.

It is, additionally, a purpose to provide a method and a means by which a disc of felt is shaped into a more or less flat, conical body by a substantially, uniform tension action, exerting an effort centripetally, uniformly on the overturned marginal part of the disc while this envelops the flat, conical core.

A feature of the invention is to eliminate compacting or pressure effects and to accomplish the desired shaping of the original flat felt disc by a method in which a flat bottom core is laid on the disc concentrically and the exposed margin of the disc is drawn upwardly over the top of the core and gathered by a contracting device by which the infolded margin is maintained under the centripetal pull, as to the center of the form, thereby exerting a uniform pull of the disc material throughout its flat bottom, and over the rim of the core and radially inward; this contracting tension of the fiber being maintained while the article is being treated until the ultimate shape has been acquired and set by drying of the felt.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1:
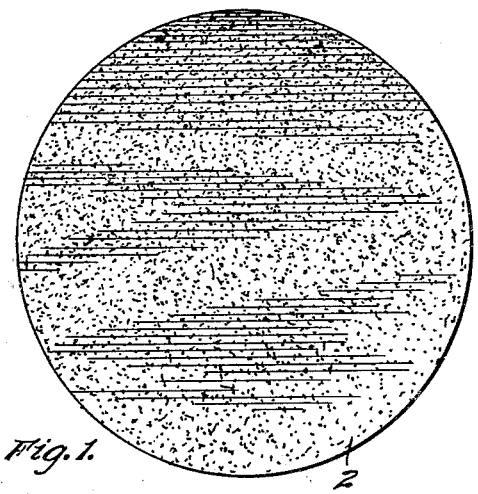
Figure 3:
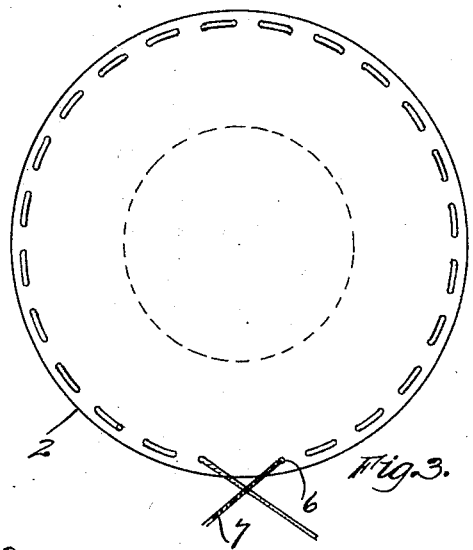
Figure 2:
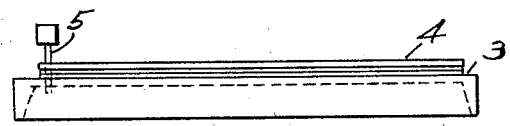
Figure 4:
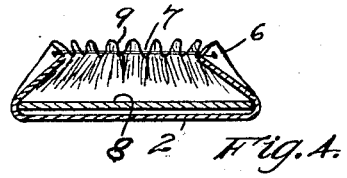
Figure 7:
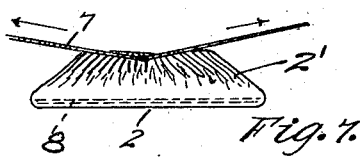
Figure 5:
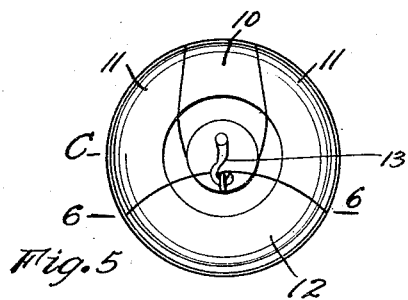
Figure 6:
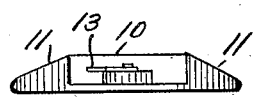
Figure 8:
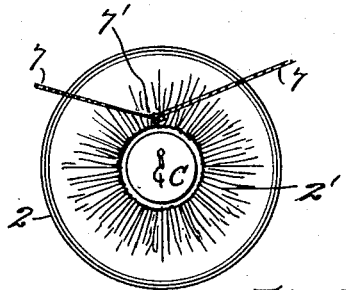
Figure 9:
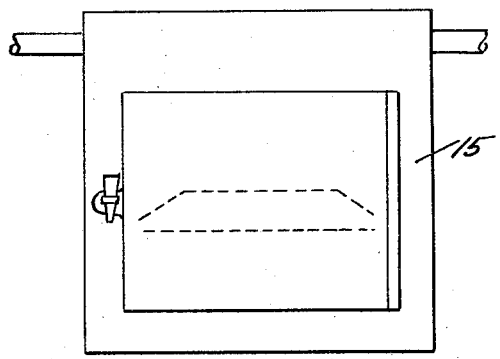
Figure 10:
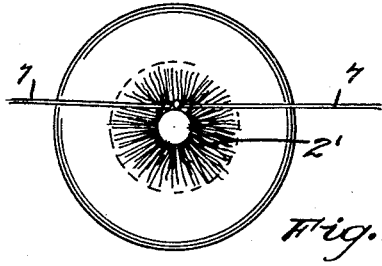
Figure 11:
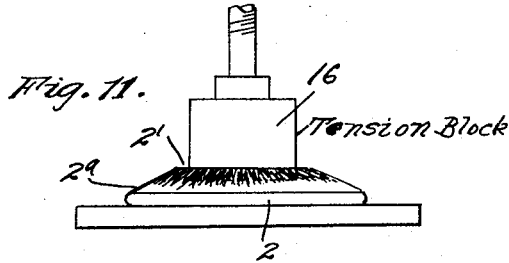
Figure 15:
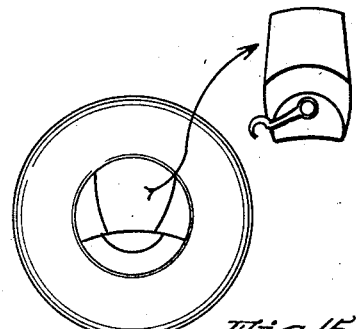
Figure 12:
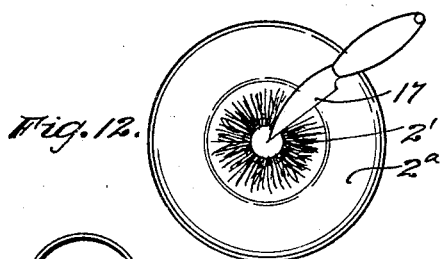
Figure 16:
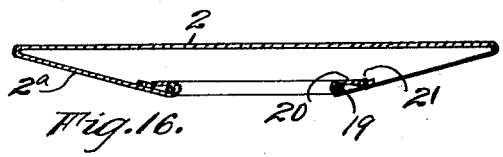
Figure 13:
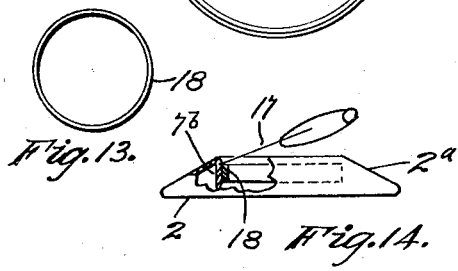
Figure 14:
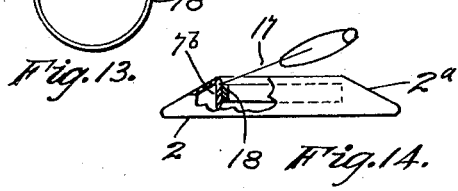
Figure 17:
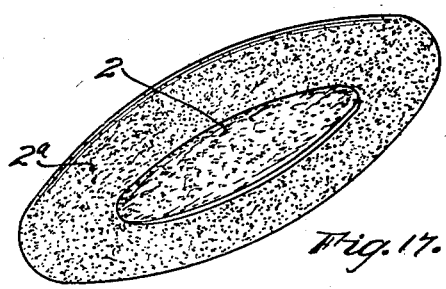

Figure 1 is a plan of the cut, felt disc blank. Figure 2 is a view showing a marginal punching step of the method. Figure 3 is a plan showing the disc having a drawstring rove in the marginal punch holes. Figure 4 shows a preventor shim inserted in the partly overfolded and gathered margin of the blank. Figure 5 is a plan of a form of sectional, conical core or block. Figure 6 is a front view of assembled sections of the core looking toward line 6—6, one section being removed. Figure 7 is an elevation of the blank having its margin partly drawn over the inserted core. Figure 8 is a plan showing the blank margin contracted and tied. Figure 9 is an illustration of a steam box for steaming the articles during process. Figure 10 is a plan of a further contracting and tying step by means of a gathered cord. Figure 11 is a side elevation of a drawing step apparatus to effect a smoothing out result by tension. Figure 12 is a plan showing a step of cutting the draw-string of a shaped cap on a core. Figure 13 is a plan of a hold-down ring. Figure 14 shows the step of hold-cutting about the hold-down, guide ring. Figure 15 illustrates the extraction of a key section of the core from the molded cap. Figure 16 is a section across the cap, illustrating an inserted elastic and a stitched hem therefor. Figure 17 is a perspective of a finished beret.

A disc 2 is cut from a piece of felt of suitable quality and size, say about eighteen inches in diameter. A suitable number of these is placed on a bed 3 below a template 4 whose margin is provided with a circle of holes to receive suitable punch means 5 whereby the margin of the disc 2 is given a series of round holes 6; it being understood that the disc may be punched in any suitable manner.

There is then rove through the punch holes 6 a suitable draw-cord 7 coming out at contiguous holes so as to be gathered and securely tied. Then a flexible preventor shim 8 is placed centrally on the disc 2 and the margin of the disc is folded upward over this shim and gathered at 9 by contracting the cord 7. There is then inserted in the gathered disc a flat, conical core C preferably made with a key section 10 and side sections 11 and a filler section 12, which when in assembled relation, will be of circular form as in Fig. 5, the key section 10 and filler section 12 being connected by a hook 13, after the key section has been inserted to complete the core in the partly gathered disc margin 2' as in Fig. 7.

Following the insertion of the core, as in Fig. 7 the cord 7 is drawn tight and tied at 7' to place the overfolded margin 2' under heavy contracting tension to draw the felt over the rim of the core and smooth over the flat bottom; all of this being done while the felt is dry.

Fig. 6 illustrates an assembled core with parts 10—11 in assembled relation; the filler section 12 being removed so as to expose the basin shape top of the core.

After the felt has been drawn about the core and a cord tied as in Fig. 8, the felt covered core is inserted in a steam box 15 where it is exposed to steam at a pressure of forty to sixty pounds to insure saturation of the felt for a period of about ten minutes. At the end of this period the covered core is removed from the box and while the felt is steaming hot the cord is again tightened up to materially increase the tension of the felt and is tied to maintain tension effort as indicated in Fig. 10. While the felt is still hot and moist a draw-head 16 is forced down on the contracted margin 2' and the lower end of the draw-head depresses the gathered felt into the basin of the core so as to effectually smooth out the conical zone at 2ª over the core; this drawing action being maintained for about five minutes while the felt is warm and wet. A feature of the invention is that all of the fiber of the felt is free to conform to lines of tension while the overfolded layer is being drawn down to the top of the cone or core C.

At the completion of this drawing step the draw-head 16 is removed and a knife 17, or other means, is used to sever the cord-loop 7.

After the cord is cut a hold-down and guide ring is pressed into the basin of the core, Fig. 14; this ring holding the band 7ᵇ against the wall of the basin while the shaped felt is left to dry either naturally or by forced action.

After the felt has sufficiently dried the band 7ᵇ is cut by a knife as this is run around the top of the ring 18, which serves as a guide.

The core sections are next removed from the dry hat, the key piece being the first pulled.

There is now applied to the corner of the band an elastic or rubber loop 19, which is held in place as by a hem 20, stitched down at 21; this preferably being done while the hem is exposed outwardly over the brim or bottom of the hat.

The purpose of the shim 8 is to prevent impression of the joint lines of the sections of the core C in the surface of the felt.

What is claimed is:

1. A pressureless method of making one-piece felt berets in which a disc of felt is enveloped about a flat, conical core, threading a cord through the inturned margin of the felt and tightening said cord to place the felt uniformly under a tension acting centripetally from the rim of the core and exerting a drawing effect throughout the enveloping felt to smooth it to the core face, and exposing the felt while under uniform tension about the core to action of steam in a steam chamber.

2. A pressureless method of making one-piece felt berets in which a disc of felt is enveloped about a flat, conical core, threading a cord through the inturned margin of the felt and tightening said cord to place the felt uniformly under a tension acting centripetally from the rim of the core and exerting a drawing effect throughout the enveloping felt to smooth it to the core face, and exposing the felt while under uniform tension about the core to action of steam in a steam chamber, while steam is maintained at a pressure of forty to sixty pounds to insure saturation.

3. Concentrically shaping a disc of felt under and over a conical core, subjecting the blocked body of felt to tension acting centripetally in a uniform degree, and heating the blocked felt in a steam bath of appreciable pressure to saturate the felt, while it is under a high state of tension, then materially increasing the tension and subjecting the further tensioned felt to a strong drawing action for a period before the felt dries.

4. Concentrically shaping a disc of felt under and over a conical core, subjecting the blocked body of felt to tension acting centripetally in a uniform degree, and heating the blocked felt in a steam bath of appreciable pressure to saturate the felt, while it is under a high state of tension, then materially increasing the tension and subjecting the further tensioned felt to a strong drawing action for a period before the felt dries, and relieving the drawing action and stopping the centripetal tension and holding the drawn form to position while the felt is dried out.

5. Concentrically shaping a disc of felt under and over a conical core, subjecting the blocked body of felt to tension acting centripetally in a uniform degree, and heating the blocked felt in a steam bath of appreciable pressure to saturate the felt, while it is under a high state of tension, then materially increasing the tension and subjecting the further tensioned felt to a strong drawing action for a period before the felt dries, and relieving the drawing action and stopping the centripetal tension and holding the drawn form to position while the felt is dried out, trimming out the bottom of the form to a head hole and hemming in an elastic band.

ALEXANDER S. CARRILLO.
EARL C. DOOLITTLE.